US008543836B2

(12) United States Patent (10) Patent No.: US 8,543,836 B2
Brown et al. (45) Date of Patent: Sep. 24, 2013

(54) LIGHTWEIGHT DOCUMENT ACCESS CONTROL USING ACCESS CONTROL LISTS IN THE CLOUD STORAGE OR ON THE LOCAL FILE SYSTEM

(75) Inventors: Douglas S. Brown, Charlotte, NC (US); John F. Kelley, Clarkesville, GA (US); Todd Seager, Orem, UT (US); Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 13/215,844

(22) Filed: Aug. 23, 2011

(65) Prior Publication Data

US 2013/0054976 A1 Feb. 28, 2013

(51) Int. Cl.
*G06F 12/14* (2006.01)
(52) U.S. Cl.
USPC .............................................. 713/189; 726/26
(58) Field of Classification Search
USPC ................. 709/204, 237; 713/165, 167, 183, 713/189; 726/26, 27; 707/6
See application file for complete search history.

(56) References Cited

U.S. PATENT DOCUMENTS

| 6,742,026 | B1 | 5/2004 | Kraenzel et al. |
| 7,627,569 | B2 | 12/2009 | Gafter |
| 7,836,310 | B1 | 11/2010 | Gutnik |
| 2002/0042838 | A1* | 4/2002 | Tabayoyon et al. .......... 709/237 |
| 2005/0204008 | A1* | 9/2005 | Shinbrood .................... 709/206 |
| 2005/0210259 | A1 | 9/2005 | Richardson |
| 2006/0020824 | A1 | 1/2006 | Matthews et al. |
| 2006/0031309 | A1* | 2/2006 | Luoffo et al. ................. 709/206 |
| 2007/0005594 | A1* | 1/2007 | Pinkas et al. ...................... 707/6 |
| 2007/0005595 | A1* | 1/2007 | Gafter ............................... 707/6 |
| 2007/0061889 | A1* | 3/2007 | Sainaney ......................... 726/26 |
| 2008/0028017 | A1* | 1/2008 | Garbow et al. ............... 709/201 |
| 2009/0248808 | A1* | 10/2009 | Izumi et al. ................... 709/206 |
| 2010/0131604 | A1* | 5/2010 | Portilla ......................... 709/206 |
| 2011/0047611 | A1* | 2/2011 | Hayler et al. ................... 726/12 |
| 2011/0087690 | A1* | 4/2011 | Cairns ........................... 707/769 |

FOREIGN PATENT DOCUMENTS

| CN | 101674329 A | 3/2010 |
| EP | 2157560 A2 | 2/2010 |
| EP | 2169942 A1 | 3/2010 |
| JP | 2002033727 A | 1/2002 |
| JP | 2008009483 A | 1/2008 |

OTHER PUBLICATIONS

Jing Wang et al. "Design and Implementation of a Maintaining Management System's Security Based on .NET". Microcomputer Information, No. 24, pp. 47-49, 2009. English Abstract Only.

(Continued)

*Primary Examiner* — Kambiz Zand
*Assistant Examiner* — Gregory M Elmore
(74) *Attorney, Agent, or Firm* — Alexander Viderman; Arthur Samodovitz (57) ABSTRACT

In a method for controlling access to an encrypted document, a request to access the encrypted document is received. The access request includes a user ID and a user password. A one-way hash function is performed on the user password to generate a hash value. An access control table is searched for the hash value which indicates an authorization for the user to access the encrypted document. The hash value corresponds to a document password encrypted with the user password. The document password is decrypted using the user password. The encrypted document is decrypted using the decrypted document password.

24 Claims, 4 Drawing Sheets

(56) References Cited

OTHER PUBLICATIONS

Oracle. "Oracle® Application Express—Advanced Tutorials." Release 3.1.2. Aug. 2008. [Pertinent: Chapter 11, Sections 11-4 to 11-9]. <http://download.oracle.com/docs/cd/E10513_01/doc/appdev.310/e10497.pdf>.

Lastpass.com. "LastPass—Help Center." Date page printed May 19, 2011 <http://lastpass.com/support.php?lpnorefresh=1#whynotbuiltin>.

Usman. Addictivetips.com. "1Password—Desktop & Web Browser Based Password Manager with Dropbox Support." Nov. 8, 2010. Date page printed May 20, 2011 <http://www.addictivetips.com/windows-tips/1password-desktop-web-browser-based-password-manager-with-dropbox-support/>.

Aatif. Addictivetips.com. "LastPass Pocket is Desktop Tool to View your Passwords Offline." Oct. 27, 2010. Date page printed May 20, 2011 <http://www.addictivetips.com/internet-tips/lastpass-pocket-is-desktop-tool-to-view-your-passwords-offline/>.

Agilebits Inc. "How to Use 1PasswordAnywhere (and what is it?)". Date page printed May 19, 2011 <http://help.agile.ws/1Password3/1passwordanywhere.html>.

* cited by examiner

LIGHTWEIGHT DOCUMENT ACCESS CONTROL USING ACCESS CONTROL LISTS IN THE CLOUD STORAGE OR ON THE LOCAL FILE SYSTEM

FIELD OF THE INVENTION

The present invention relates generally to document access control, and more specifically the control of access to documents available from a network.

BACKGROUND

Electronic documents may include sensitive information whose access should be restricted. It was known to encrypt sensitive electronic documents to prevent unauthorized access. In addition to encryption, access to restricted information is often controlled through the use of access control lists (ACLs). Typically, an ACL specifies which users have access to protected data and the level of access that users have to the protected data. The list can include an entry for each user that has access privileges. The ACL can be maintained as a table on a local system or it may be maintained in the cloud.

"Cloud computing" is well known today and refers to the access of computing resources and data via a network infrastructure, such as the Internet. The computing resources and data storage may be provided by linked data centers of the "cloud" (network). Each of the data centers typically includes a plurality of servers that provide data storage and retrieval services. Such services include, for example, backup and restoration of data, data migration, data sharing, data collaboration, and so on. Cloud storage services are accessible from anywhere in the world. Thus, cloud storage promotes collaboration between hundreds and thousands of users sharing the same files or objects.

One popular standard that has been developed for remote authentication of users is the Light-weight Directory Access Protocol (LDAP). LDAP may be used to authenticate users to access resources that may reside locally or remotely to the user. Typically, especially in small business environments, the LDAP server is located remotely from the user. Utilizing a remote LDAP server provided through a service provider allows the small business to save the cost of providing its own local LDAP servers. Connectivity to the LDAP server is provided via the Internet, an intranet or other computer network. In some instances, some resources, such as web pages or web applications, may be located on the local client machine. Authentication of the user by the LDAP server would still be required before the user could access such resources. In the case where the client machine is a mobile computer, the client machine will often be disconnected from the network. In such an instance, the user would be unable to access the secure resources on the mobile client machine because there would be no connectivity to the LDAP server. In the case of a business environment, this can cause serious productivity losses.

SUMMARY

In a first embodiment of the present invention, there is a program product and method for controlling access to an encrypted document. A computer receives a request to access the encrypted document, the access request comprising a user ID and a user password. The computer performs a one-way hash function on the user password to generate a hash value. The computer searches an access control table for the hash value which indicates an authorization for the user to access the encrypted document and corresponds to a document password encrypted with the user password. The computer decrypts the document password using the user password. The computer decrypts the encrypted document using the decrypted document password.

In a second embodiment of the present invention, there is a program product and method for controlling access to a web page. A computer receives an email message. The email message includes a hyperlink to the encrypted web page. A markup language document for the encrypted web page includes program code to request a user ID and a user password from a user of the computer and to determine whether the user is authorized to access the web page, and if so, to decrypt the web page. The computer invokes the program code in response to a user request to display the encrypted web page. In response to the authentication of the user, the computer decrypts the web page and displays the web page.

DETAILED DESCRIPTION

Figure 1:
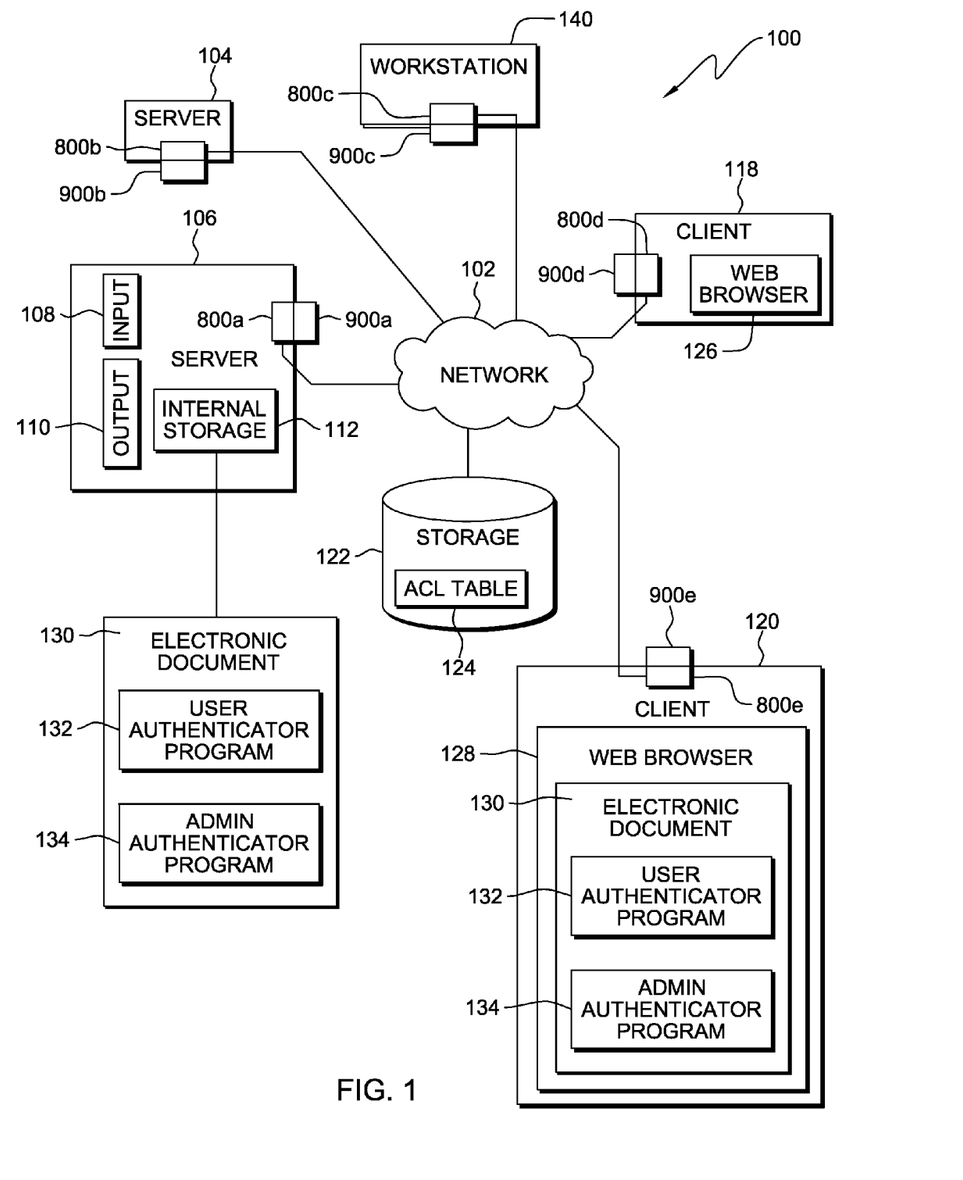
FIG. 1 is an illustration of a distributed data processing environment for controlling access to restricted information in accordance with one embodiment of the present invention.

The present invention will now be described with reference to the figures. It should be appreciated that FIG. 1 is only provided as an illustration of one implementation and is not intended to imply any limitation with regard to the environments in which different embodiments may be implemented. Many modifications to the depicted environments may be made.

FIG. 1 illustrates a distributed data processing system generally designated 100 in accordance with one embodiment of the present invention. System 100 includes a server computer 104, a server computer 106, and a storage 122 (which contains an ACL table 124). Multiple client computers 118 and 120 are coupled to servers 104 and 106 via a network 102 such as the Internet. Network 102 represents a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages. Alternatively, the computers and other devices of data processing system 100 may be interconnected by different types of networks, such as an intranet, a local area network (LAN), or a wide area network (WAN).

Network 102 may include communication connections, such as wire, wireless communication links, or fiber optic cables.

Client computers 118 and 120 may be, for example, mobile devices, telephones, television receivers, cell phones, personal digital assistants, netbooks, laptop computers, tablet computers, desktop computers, and/or any type of computing devices capable of rendering electronic documents to the display. Client computers 118 and 120 contain web browsers 126 and 128 to create user interfaces. An exemplary web browser application 126 and 128 is the "Internet Explorer" application manufactured and distributed by Microsoft Corporation of Redmond, Wash., for accessing various web sites.

In the illustrated example, server computer 106 is a web server capable of interacting with web browsers 126 and 128 and other web servers 104. Data is communicated between server computers 104 and 106 and client computers 118 and 120 using the hypertext transfer protocol (http), a protocol commonly used on the Internet to exchange information. Distributed data processing system 100 may include additional server computers, client computers, displays and other devices not shown. Client computers 118 and 120 are clients to server computer 106 in this example. Server computer 106 may contain an input device 108 and an output device 110.

Server computer 106 obtains an electronic document 130 from internal storage 112 or remote storage, and sends the electronic document 130 to client computer 118 in response to receiving a request from web browser 128 of client computer 120 for electronic document 130. The term electronic document refers to a document that can be processed by a computer. For example, electronic document 130 can be a web page, a text document in Portable Document Format (PDF), or other similar documents that can be viewed and manipulated. Web page is an electronic document described in HTML (Hyper Text Markup Language) stored on server computer 106 as a file (HTML file). Electronic document 130 can also be a plurality of web pages linked to each other via standard HTML links. In various embodiments, a creator of electronic document 130 encrypts its content (entirely or partially) using a document password to control access to electronic document 130. If electronic document 130 is a web page, the document creator sends the web page 130 to server computer 106 (web server) for publication via network 102, and sends the hyperlink for that web page to a potential user (viewer) of electronic document 130. Similarly, if electronic document 130 is another type of data file, the document creator sends the data file to server computer 106 (web server) for publication via network 102, and sends an icon/hyperlink for that data file to a potential user (viewer) of electronic document 130.

The creator of electronic document 130 may store the document password which was used to encrypt electronic document 130 in an ACL table 124 of storage unit 122. In this example, user authenticator program 132 and admin authenticator program 134, as described below, employ ACL table 124 to manage user access with respect to electronic document 130. ACL table 124 can include an entry for each user that has access privileges. Each entry may include a set of encrypted fields. For example, each entry in ACL table 124 may include encrypted logon credentials, such as hash values for login ID and password, user roles associated with such credentials, an encrypted version of expiration date associated with such ACL entry, a document password encrypted with user's login password, an encrypted version of the administrator's password, and the like. Thus, the creator of electronic document 130 assigns passwords to potential viewers of electronic document 130 using ACL table 124. It is to be understood, that in some embodiments a single login password may have multiple login IDs explicitly associated therewith. In other words, a group of users may share a single login password. In such embodiments a user should enter one of the multiple login IDs associated with the login password in order to get access to electronic document 130. It is to be further understood, that a single login password may have no login IDs associated therewith, thereby allowing the use of any arbitrary login ID with the defined login password. In some embodiments storage unit 122 may be a document repository in a cloud computing environment. In other embodiments, ACL table 124 may be kept on the local file system of a client with no connection to the internet.

User authenticator program 132 and admin authenticator program 134, included in distributed data processing system 100, may comprise program instructions stored on one or more computer-readable tangible storage devices, which may include internal storage 112 on server computer 106. User authenticator program 132 authenticates users without administrative privileges to access electronic document 130 by employing a decryption mechanism. Admin authenticator program 134 authenticates users with administrative privileges to perform administrative functions as needed.

Figure 2:
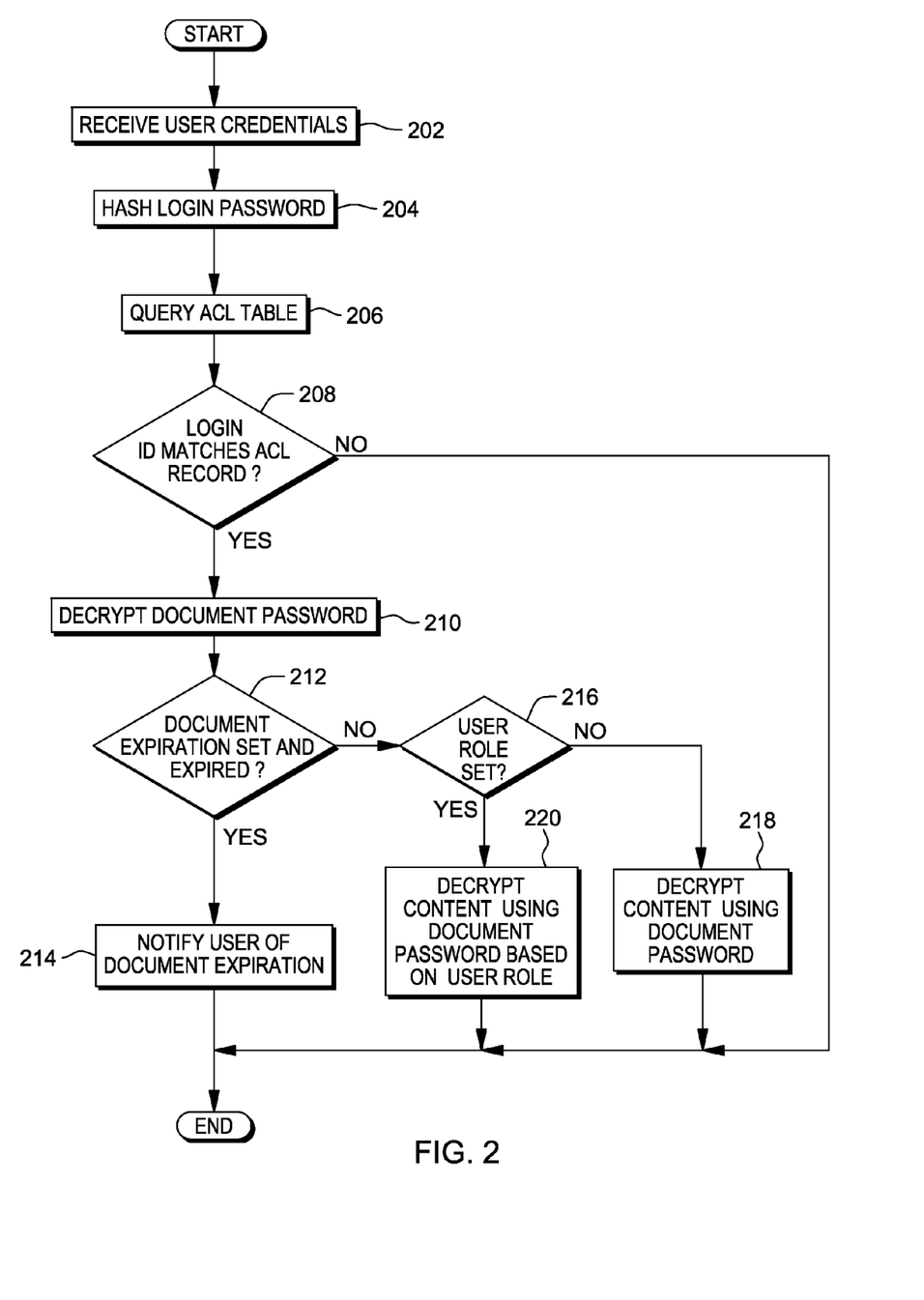
FIG. 2 illustrates in more detail the steps performed by a user authenticator program of the distributed data processing environment of FIG. 1 for authenticating users without administrative privileges, according to one embodiment of the present invention.
Figure 3:
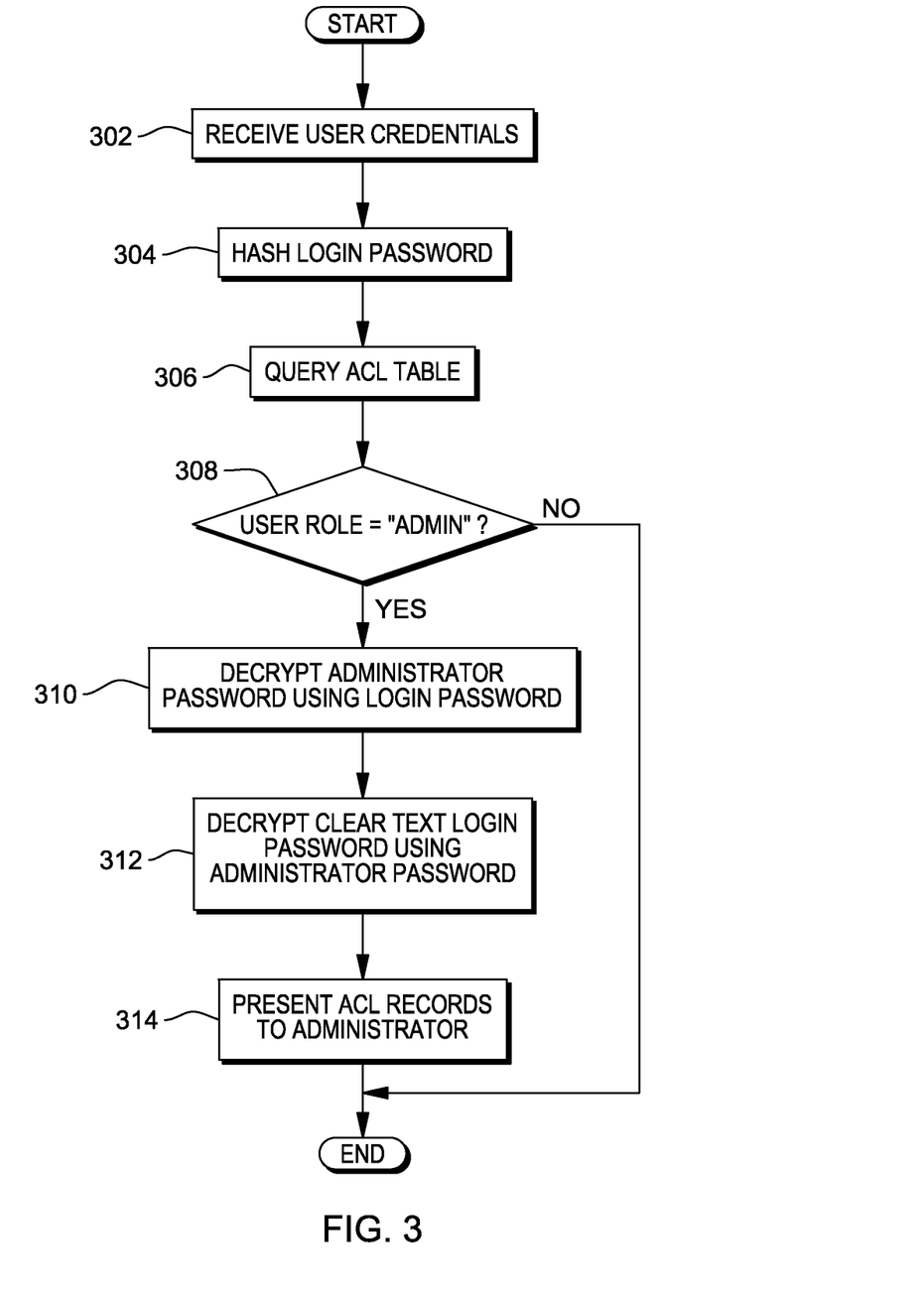
FIG. 3 illustrates in more detail the steps performed by an admin authenticator program of the distributed data processing environment of FIG. 1 for authenticating users with administrative privileges, according to one embodiment of the present invention.

Preferably, user authenticator program 132 and admin authenticator program 134 are embedded in or packaged with electronic document 130 and sent by server computer 106 to the target client computer 120 along with the web page or data file of electronic document 130. Consequently, the user of client computer 120 need not separately obtain a copy of or maintain authenticator program 132 and admin authenticator program 134. Also, the user of client computer need not access a separate authentication and authorization server to obtain access to the electronic document 130 (except to access the ACL table 124). User authenticator program 132 and admin authenticator program 134 may be written in any of a variety of client-side interpretable scripting languages such as, but not limited to, JavaScript, VBScript, and the like which can be associated with the web page or data file of electronic document 130 and executed via a web browser 128 in client computer 120. For example, user authenticator program 132 and admin authenticator program 134 may comprise JavaScript statements embedded in an HTML page of the web page of electronic document 130. If electronic document 130 is a web page, web browser 128 invokes user authenticator program 132 and admin authenticator program 134 when the user clicks on the hyperlink for that web page, previously received from the creator. The invoked user authenticator program 132 and/or admin authenticator program 134 then requests authentication information, such as the user's login ID and password, from the user seeking an access to electronic document 130. It should be noted that at this point web browser 128 may have received the content of electronic document 130, such as a web page, but the content is encrypted (and not yet displayed). FIGS. 2 and 3 illustrate in more details the steps performed by the user authenticator program 132 and admin authenticator program 134, respectively, as described below.

According to another embodiment of the present invention, the creator of electronic document 130 via a workstation 140 sends electronic document 130 to a user of client computer 120 in an email, as an attached file. In alternative embodiments, the creator sends electronic document 130 to a user of client computer 120, as an attached file, in an instant message. The attached file also includes the user authenticator program 132 and admin authenticator program 134. The attached file may also include the ACL table 124 if the document is expected to be opened on a computer without a network connection. The creator also sends the predetermined password to the user as part of the attached file. Alternatively, this password could be sent in a separate email or instant message.

In this embodiment, if electronic document 130 is a web page, web browser 128 invokes user authenticator program 132 and admin authenticator program 134 when the user launches the web page 130 that came in the email. User authenticator program 132 authenticates the user of client computer 118 seeking access to electronic document 130 by requesting authenticating information, such as the user's login ID and password.

FIG. 2 illustrates in more detail the steps performed by the user authenticator program 132 of FIG. 1 for authenticating users without administrative privileges, according to one embodiment of the present invention. At step 202, user authenticator program 132 obtains authentication information from the user seeking an access to electronic document 130. The authentication information can include the user's login ID and password, which were previously created and assigned to potential viewers of electronic document 130. At step 204, user authenticator program 132 performs a one-way hash function on the plain text password entered by the user to generate a "hash value". Examples of different one-way hash functions that are suitable for use in the invention include: Snefru, N-Hash, MD4, MD5, M2 and Secure Hash Algorithm (SHA). Most of these algorithms and the respective strengths and weaknesses of each are well known to those skilled in the art. As used herein, the term "hash value" referrers generally to a value—generated by a one-way hash function—that is specific to a given password. Each password has a corresponding and effectively distinct hash value.

At step 206, user authenticator program 132 queries ACL table 124 for hash value generated at step 204 to identify a corresponding record. It should be understood that records in ACL table 124 may be indexed by the hashed password values. Accordingly, user authenticator program 132 accelerates a table lookup operation by employing hash values.

At step 208, upon receiving the search results, user authenticator program 132 determines whether the records identified at step 206 contain the login ID obtained at step 202, or, alternatively, whether any record with a matching hash value contains no associated login IDs, indicating open access for any login ID paired with the matching password. If user authenticator program 132 determines that ACL table 124 does not include user's login ID/password combination (decision 208, no branch), user authenticator program 132 denies user's request to access electronic document 130. In some embodiments, user authenticator program 132 may give the user an opportunity to re-enter the login ID and password by returning to step 202. If, however, user authenticator program 132 determines that ACL table 124 contains user's authentication information (decision 208, yes branch), user authenticator program 132 decrypts the document password by using the user's plain text (unhashed) password, at step 210. Decryption of the document password may be accomplished by a number of different means. In one embodiment of the invention, user authenticator program 132 uses the Blowfish algorithm. Blowfish encryption scheme is a symmetric block cipher developed by Bruce Schneier. It is a preferred algorithm for use with embodiments of the present invention, because it is simple (generally requiring less than 5K of memory to implement); it is fast (usually requiring 18 clock cycles per byte), the key length is variable and can be as long as 448 bits; it uses key-dependent S boxes, making brute-force attacks more difficult than may be apparent because of the time consuming sub-key generation; and it uses mixed operators, making crypto-analysis very difficult. Code implementing the Blowfish algorithm is publically available for a number of computing languages. See Stallings, Cryptography and Network Security, $2^{nd}$ Ed., Prentice Hall, Upper Saddle River, N.J., 1998 describing the Blowfish and other algorithms suitable for the present invention. The Blowfish algorithm, as used in one embodiment of the present invention, is a symmetric key algorithm, meaning that the encryption key (user's unhashed password) is equal to the decryption key. The Blowfish algorithm, however, is not the only possible choice. It is also possible to use other symmetric encryption algorithms. Whether or not the Blowfish algorithm is used, embodiments of the present invention generally employ functions for decrypting data.

In some embodiments of the present invention there is an expiration date associated with each ACL table 124 record. In such embodiments, the expiration date is encrypted using the document password as the selected encryption key. At step 212, user authenticator program 132 determines if an ACL table 124 record contains an expiration date. If the expiration date exists user authenticator program 132 compares it to the current date. If user authenticator program 132 determines that the current date is beyond the expiration date (decision 212, yes branch), user authenticator program 132 sends a notification message to client computer 118, at step 214. For instance, an expiration notification may notify a user of the expiration of subscription or a trial period for electronic document 130. If, however, user authenticator program 132 determines that the current date is before the expiration date or if the expiration date has not been set in ACL table 124 (decision 212, no branch), user authenticator program 132 determines whether a security role field has been set in the retrieved ACL table 124 record, at step 216.

In an embodiment, specific information within electronic document 130 may be accessible only to certain users, based on their roles and permissions. Security constraints may be associated with data fields comprising electronic document 130. Security role may comprise a list of permissions for data fields. Each security role can be associated with a set of data fields that are accessible to users belonging to a particular security role. Each user belonging to the security role is granted access to each field associated with the security role. For example, a set of users may be allowed access to only specific fields of the document. For illustration purposes only, suppose an encrypted electronic document 130 contains information about a real estate listing. The roles associated with electronic document 130 might be, for example, but not limited to, "seller's agent", "buyer's agent", "buyer", "seller", "appraiser", and the like. Data fields contained within the document may include the properties address, name of seller, asking price, appraisal value, a list of bidders and their current bids, the properties characteristics such as dimensions, amenities, and so on. For example, an appraiser would be allowed read access to property data, which characterizes the property: its address, dimensions, amenities, and other data related to valuation. The appraisal would be allowed to edit the appraisal value field. An appraiser would not be allowed access to the seller's asking price or any of the bid information. The two agents may be allowed to see all the data.

If user authenticator program 132 determines that the user role field is set in the retrieved ACL table 124 record (decision 216, yes branch), user authenticator program 132 decrypts the content of electronic document 130 in accordance with user's role by using the document password (decrypted at step 210) as a decryption key, at step 220. Continuing with the real estate listing example above, once user authenticator program 132 determines that user's role is, for instance, appraiser, user authenticator program 132 decrypts only property data which characterizes the property, preventing a user from viewing unauthorized information. If, however, user authenticator program 132 determines that the user role field has not been set in ACL table 124 record (decision 216, no branch), user authenticator program 132 decrypts the entire content of electronic document 130, at step 218. It is to be understood, that after user authenticator program 132 decrypts electronic document 130, web browser 128 renders decrypted electronic document 130 on the display. As previously indicated, decryption of the document password may be accomplished by a number of different means, such as, but not limited to, the Blowfish algorithm.

FIG. 3 illustrates in more detail the steps performed by the admin authenticator program 134 of FIG. 1 for enabling users with administrative privileges to perform administrative functions, according to one embodiment of the present invention. Steps 302 through 306 of this embodiment are identical to steps 202 through 206 shown in FIG. 2, i.e., at step 302, admin authenticator program 134 obtains authentication information from the user seeking an access to electronic document 130; at step 304, admin authenticator program 134 performs a one-way hash function on the plain text password entered by the user to generate a "hash value"; at step 306, admin authenticator program 134 queries ACL table 124 for hash value generated at step 304 to identify a corresponding record. At step 308, admin authenticator program 134 examines the record from ACL table 124 that was retrieved in step 306 to determine whether the user seeking access is authorized to perform administrative functions. Specifically, in step 308, admin authenticator program 134 first performs the same user ID matching as performed in step 208 and, if a match is found, uses the record from ACL table 124 that was retrieved in step 306 to determine if the role field in the record has a value corresponding to the administrator's role. The administrative functions include, for example, assigning and updating authorizations to users, adding and updating ACL records, roles, and the like. If admin authenticator program 134 determines that the user is not authorized to perform administrative functions (decision 308, no branch), then admin authenticator program 134 may send a message to notify the user that access has been denied. If, however, admin authenticator program 134 determines that the user is authorized to perform administrative functions (decision 308, yes branch), admin authenticator program 134 decrypts administrator's password by using the user's plain text (unhashed) password, at step 310.

At step 312, admin authenticator program 134 decrypts clear text login passwords and, in some embodiments, associated login IDs for all records in the ACL table 124 by using administrator's password, decrypted in step 310. The creator of electronic document 130 includes these fields in ACL table 124 explicitly to enable users with administrative privileges to perform administrative functions.

In an example embodiment, electronic document 130 may comprise a plurality of web pages. One of the web pages may be customized to include an administrator options panel that would enable an administrator to review, add, edit and/or delete information relating to user access with respect to electronic document 130. At step 314, admin authenticator program 134 retrieves all records from ACL table 124 via a database search query and displays these records in a decrypted form in the web browser 128. Web browser 128 enables an administrator to perform administrative functions, such as, cloning an existing ACL table 124 record and modifying it to create a new record, looking up the predetermined login password on an existing ACL table 124 record, and the like.

Figure 4:
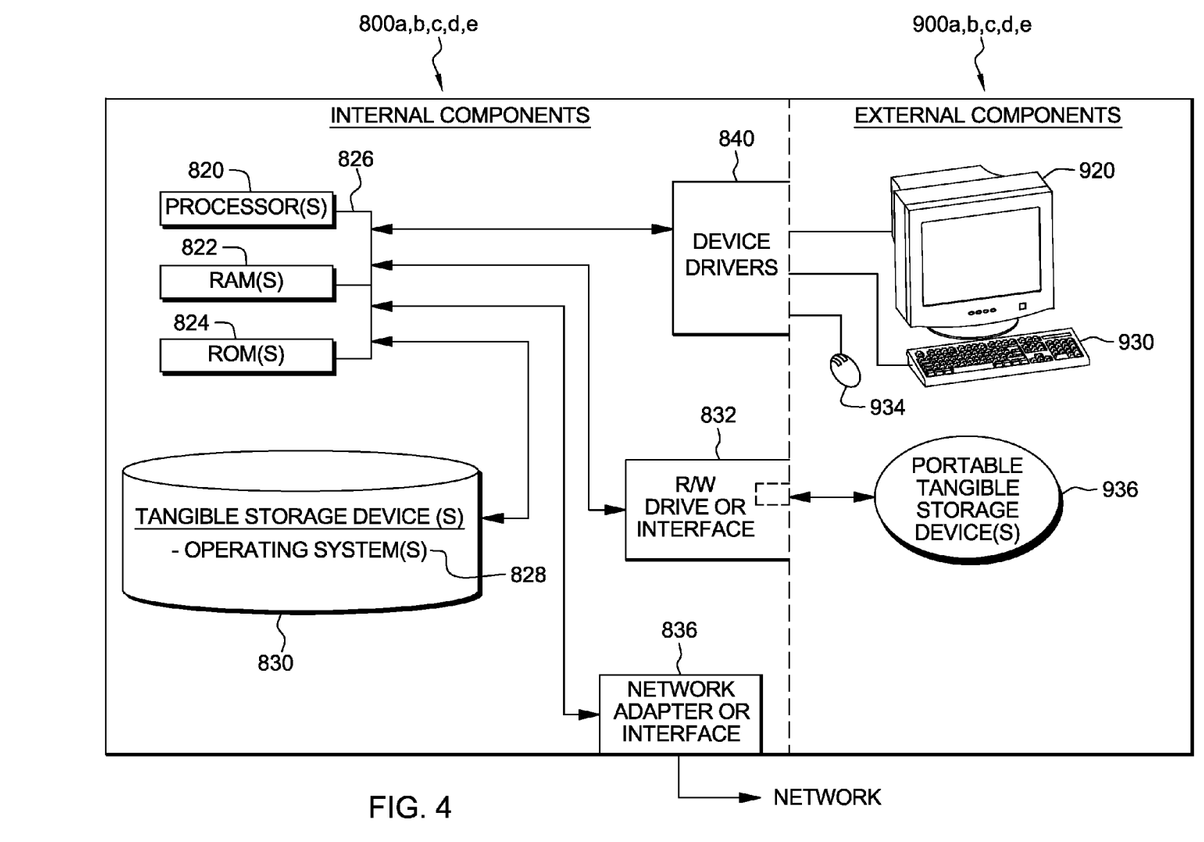
FIG. 4 is a block diagram of internal and external components of each of the computers of FIG. 1.

Computers 106, 104, 140, 118 and 120 include respective sets of internal components 800a,b,c,d,e and external components 900a,b,c,d,e illustrated in FIG. 4. Each of the sets of internal components 800a,b,c,d,e includes one or more processors 820, one or more computer-readable RAMs 822 and one or more computer-readable ROMs 824 on one or more buses 826, and one or more guest operating systems 828 and one or more computer-readable tangible storage devices 830. The one or more operating systems 828, user authenticator program 132, and admin authenticator program 134 are stored on one or more of the computer-readable tangible storage devices 830 for execution by one or more of the processors 820 via one or more of the RAMs 822 (which typically include cache memory). ACL table 124 is also stored on one or more computer-readable tangible storage devices 830. In the embodiment illustrated in FIG. 4 each of the computer-readable tangible storage devices 830 is a magnetic disk storage device of an internal hard drive. Alternatively, each of the computer-readable tangible storage devices 830 is a semiconductor storage device, such as ROM 824, EPROM, flash memory or any other computer-readable tangible storage device that can store a computer program and digital information.

Each set of internal components 800a,b,c,d,e also includes a R/W drive or interface 832 to read from and write to one or more portable computer-readable tangible storage devices 936 such as a CD-ROM, DVD, memory stick, magnetic tape, magnetic disk, optical disk or semiconductor storage device. The user authenticator program 132 and admin authenticator program 134 can be stored on one or more of the portable computer-readable tangible storage devices 936, read via R/W drive or interface 832 and loaded into one or more computer-readable tangible storage devices 830.

Each set of internal components 800a,b,c,d,e also includes a network adapter or interface 836 such as a TCP/IP adapter card. The user authenticator program 132 and admin authenticator program 134 can be downloaded to data processing system 100 from an external computer via a network (for example, the Internet, a local area network or other, wide area network) and network adapter or interface 836. From the network adapter or interface 836, the user authenticator program 132 and admin authenticator program 134 are loaded into one or more computer-readable tangible storage devices 830. The network may comprise copper wires, optical fibers, wireless transmission, routers, firewalls, switches, gateway computers and/or edge servers.

Each of the sets of external components 900a,b,c,d,e include a computer display monitor 920, a keyboard 930, and a computer mouse 934. Each set of internal components 800a,b,c,d,e also includes device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

User authenticator program 132 and admin authenticator program 134 can be written in various programming languages including low-level, high-level, object-oriented or non object-oriented languages. Alternatively, the functions of user authenticator program 132 and admin authenticator program 134 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for controlling access to an encrypted document, the method comprising the steps of:
receiving a request to access the encrypted document, wherein the access request comprises a user ID and a user password;
performing a one-way hash function on the user password to generate a hash value;
searching an access control table for the hash value which indicates an authorization for the user to access the encrypted document and corresponds to a document password encrypted with the user password;
decrypting the document password using the user password, wherein the document password comprises a decryption key for the encrypted document; and
decrypting the encrypted document using the decrypted document password.

2. The method of claim 1, wherein the hash value also corresponds to an expiration date, and wherein the step of decrypting the encrypted document further comprises the steps of:
comparing, by one or more processors, the expiration date with a current date; and
decrypting the encrypted document in response to determining that the current date is before the expiration date.

3. The method of claim 1, wherein the hash value corresponds to a plurality of user IDs.

4. The method of claim 1, wherein an access to the access control table is provided as a service in a cloud environment.

5. The method of claim 1, wherein the hash value corresponds to a security role and wherein the step of decrypting the encrypted document further comprises the computer decrypting the encrypted document in accordance with the security role.

6. The method of claim 1, wherein the encrypted document has been encrypted using a symmetric encryption algorithm.

7. A computer program product for controlling access to an encrypted document, the computer program product comprising:
one or more computer-readable storage devices and program instructions stored on at least one of the one or more computer-readable storage devices, the program instructions comprising:
program instructions to receive a request to access the encrypted document, wherein the access request comprises a user ID and a user password;
program instructions to perform a one-way hash function on the user password to generate a hash value;
program instructions to search an access control table for the hash value which indicates an authorization for the user to access the encrypted document and corresponds to a document password encrypted with the user password;
program instructions to decrypt the document password using the user password, wherein the document password comprises a decryption key for the encrypted document; and
program instructions to decrypt the encrypted document using the decrypted document password.

8. The computer program product of claim 7, wherein the hash value also corresponds to an expiration date and wherein the program instructions to decrypt the encrypted document further comprise:
program instructions to compare the expiration date with a current date; and
program instructions to decrypt the encrypted document if the current date is before the expiration date.

9. The computer program product of claim 7, wherein the hash value corresponds to a plurality of user IDs.

10. The computer program product of claim 7, wherein an access to the access control table is provided as a service in a cloud environment.

11. The computer program product of claim 7, wherein the hash value corresponds to a security role and wherein the program instructions to decrypt the encrypted document further comprise program instructions to decrypt the encrypted document in accordance with the security role.

12. The computer program product of claim 7, wherein the encrypted document has been encrypted using a symmetric encryption algorithm.

13. A method for controlling access to an encrypted web page, the method comprising the steps of:
receiving an email message, wherein the email message comprises a hyperlink to the encrypted web page and wherein a markup language document for the encrypted web page includes program code to request a user ID and password from a user of the computer and to determine whether the user is authorized to access the web page, and if so, to decrypt the web page;
receiving an access control table as an attachment to the email message;
invoking the program code, in response to a user request to display the encrypted web page, to determine that the user is authorized to access the web page by searching the access control table; and
invoking the program code to decrypt the web page and to display the web page, in response to the determination of authorization of the user to access the web page.

14. The method of claim 13, wherein the program code, when executed by the computer, further performs the steps of:
receiving a request to access the encrypted web page, and in response, requesting the user ID and the password from the user;
performing a one-way hash function on the user password to generate a hash value;
searching the access control table for the hash value which indicates an authorization for the user to access the encrypted web page and corresponds to a document password encrypted with the user password;
decrypting the document password using the user password; and
decrypting the encrypted web page using the decrypted document password.

15. The method of claim 14, wherein the hash value also corresponds to an expiration date, and wherein the step of decrypting the encrypted web page further comprises the steps of:
comparing, by one or more processors, the expiration date with a current date; and
decrypting the encrypted web page in response to determining that the current date is before the expiration date.

16. The method of claim 14, wherein the hash value corresponds to a plurality of user IDs.

17. The method of claim 14, wherein an access to the access control table is provided as a service in a cloud environment.

18. The method of claim 14, wherein the hash value corresponds to a security role and wherein the step of decrypting the encrypted web page further comprises decrypting the encrypted web page in accordance with the security role.

19. A computer program product for controlling access to an encrypted web page, the computer program product comprising:

one or more computer-readable storage devices and program instructions stored on at least one of the one or more computer-readable storage devices, the program instructions comprising:

program instructions to receive an email message, wherein the email message comprises a hyperlink to the encrypted web page and wherein a markup language document for the encrypted web page includes program code to request a user ID and password from a user of the computer and wherein the markup language document for the encrypted web page includes program code to determine whether the user is authorized to access the web page, and if so, to decrypt the web page;

program instructions to receive an access control table as an attachment to the email message;

program instructions to invoke the program code, in response to a user request to display the encrypted web page to determine that the user is authorized to access the web page by searching the access control table; and program instructions to invoke the program code to decrypt the web page and to display the web page at the computer, in response to the determination of authorization of the user to access the web page.

20. The computer program product of claim 19, wherein the program code further comprises:

program instructions to receive a request to access the encrypted web page, and in response, to request the user ID and the password from the user;

program instructions to perform a one-way hash function on the user password to generate a hash value;

program instructions to search the access control table for the hash value which indicates an authorization for the user to access the encrypted web page and corresponds to a document password encrypted with the user password;

program instructions to decrypt the document password using the user password; and program instructions to decrypt the encrypted web page using the decrypted document password.

21. The computer program product of claim 20, wherein the hash value also corresponds to an expiration date and wherein the program instructions to decrypt the encrypted web page further comprise:

program instructions to compare the expiration date with a current date; and program instructions to decrypt the encrypted web page if the current date is before the expiration date.

22. The computer program product of claim 20, wherein the hash value corresponds to a plurality of user IDs.

23. The computer program product of claim 20, wherein an access to the access control table is provided as a service in a cloud environment.

24. The computer program product of claim 20, wherein the hash value corresponds to a security role and wherein the program instructions to decrypt the encrypted web page further comprise program instructions to decrypt the encrypted web page in accordance with the security role.

* * * * *